United States Patent
Nakao

(10) Patent No.: US 10,353,469 B2
(45) Date of Patent: Jul. 16, 2019

(54) TACTILE SENSATION PROVIDING DEVICE

(71) Applicant: KYOCERA Corporation, Kyoto (JP)

(72) Inventor: Fumiaki Nakao, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/526,032

(22) PCT Filed: Nov. 11, 2015

(86) PCT No.: PCT/JP2015/005625
§ 371 (c)(1),
(2) Date: May 11, 2017

(87) PCT Pub. No.: WO2016/075935
PCT Pub. Date: May 19, 2016

(65) Prior Publication Data
US 2017/0315617 A1 Nov. 2, 2017

(30) Foreign Application Priority Data

Nov. 12, 2014 (JP) .................................. 2014-229420
Nov. 12, 2014 (JP) .................................. 2014-229421

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01); *G06F 2203/04105* (2013.01)

(58) Field of Classification Search
CPC ............ G06F 3/01; G06F 3/016; G06F 3/041; 06F 3/0412; G06F 3/0414; G06F 2203/04105
USPC ............................. 345/173; 178/18.01, 18.03
See application file for complete search history.

(56) References Cited

U.S. PATENT DOCUMENTS

| 7,342,573 | B2 * | 3/2008 | Ryynanen | ................ G06F 3/016 345/173 |
| 7,436,396 | B2 | 10/2008 | Akieda et al. | |
| 8,633,916 | B2 | 1/2014 | Bernstein et al. | |
| 8,797,295 | B2 | 8/2014 | Bernstein et al. | |

(Continued)

FOREIGN PATENT DOCUMENTS

| JP | H07-155297 A | 6/1995 |
| JP | 2004-047852 A | 2/2004 |

(Continued)

OTHER PUBLICATIONS

English Language Machine Translation of JP-2004-047852 (Year: 2004).*

(Continued)

*Primary Examiner* — Jason M Mandeville
(74) *Attorney, Agent, or Firm* — Studebaker & Brackett PC

(57) ABSTRACT

The tactile sensation providing device includes a panel, an actuator, and a conversion unit that engages with the panel and the actuator and that, in response to displacement of the actuator, converts a displacement direction and a displacement amount of the actuator to a different displacement direction and a different displacement amount and displaces the panel according thereto. The displacement direction of the panel is a thickness direction of the panel, and the displacement direction of the actuator intersects with the displacement direction of the panel.

8 Claims, 13 Drawing Sheets

(56) References Cited

U.S. PATENT DOCUMENTS

| | | | |
|---|---|---|---|
| 9,122,308 B2* | 9/2015 | Lee | G06F 3/016 |
| 9,274,660 B2 | 3/2016 | Bernstein et al. | |
| 9,280,248 B2 | 3/2016 | Bernstein et al. | |
| 9,400,582 B2 | 7/2016 | Bernstein et al. | |
| 9,535,557 B2 | 1/2017 | Bernstein et al. | |
| 9,829,982 B2* | 11/2017 | Bernstein | G06F 3/016 |
| 2005/0179565 A1* | 8/2005 | Mase | G06F 3/016 341/21 |
| 2006/0022952 A1* | 2/2006 | Ryynanen | G06F 3/016 345/173 |
| 2006/0109254 A1 | 5/2006 | Akieda et al. | |
| 2008/0084384 A1* | 4/2008 | Gregorio | G06F 3/016 345/156 |
| 2010/0231550 A1* | 9/2010 | Cruz-Hernandez | G06F 3/016 345/174 |
| 2011/0141052 A1 | 6/2011 | Bernstein et al. | |
| 2013/0069863 A1* | 3/2013 | Lee | G06F 3/016 345/156 |
| 2014/0009441 A1 | 1/2014 | Bernstein et al. | |
| 2014/0092064 A1 | 4/2014 | Bernstein et al. | |
| 2015/0160773 A1 | 6/2015 | Bernstein et al. | |
| 2015/0293631 A1 | 10/2015 | Bernstein et al. | |
| 2016/0188103 A1 | 6/2016 | Bernstein et al. | |
| 2017/0075424 A1 | 3/2017 | Bernstein et al. | |
| 2017/0108931 A1 | 4/2017 | Gregorio et al. | |

FOREIGN PATENT DOCUMENTS

| | | |
|---|---|---|
| JP | 2006-146611 A | 6/2006 |
| JP | 2010-506499 A | 2/2010 |
| JP | 4633167 B2 | 2/2011 |
| JP | 2013-066995 A | 4/2013 |
| JP | 2013-513865 A | 4/2013 |
| JP | 2014-056337 A | 3/2014 |
| JP | 2015-184886 A | 10/2015 |

OTHER PUBLICATIONS

An Office Action issued by the Japanese Patent Office dated Sep. 26, 2017, which corresponds to Japanese Patent Application No. 2014-229420 and is related to U.S. Appl. No. 15/526,032; with English Concise Explanation.

"Explanation, by using toys, of the way of managing rotation and slide at will", http://monoist.atmarkit.co.jp/mn/articles/1202/20/news005_2.html, Feb. 2012.

International Search Report issued in PCT/JP2015/005625; dated Feb. 9, 2016.

Written Opinion issued in PCT/JP2015/005625; dated Feb. 9, 2016; with English language Concise Explanation.

* cited by examiner

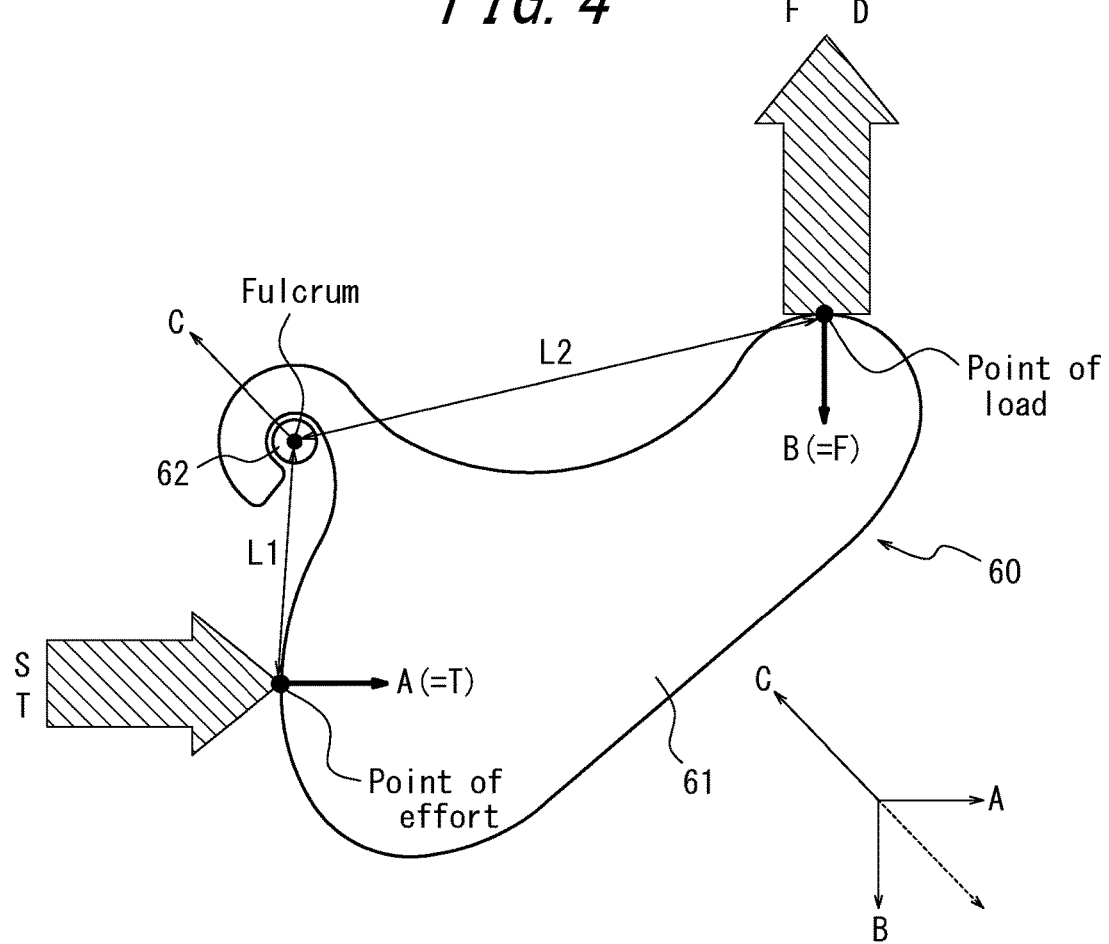

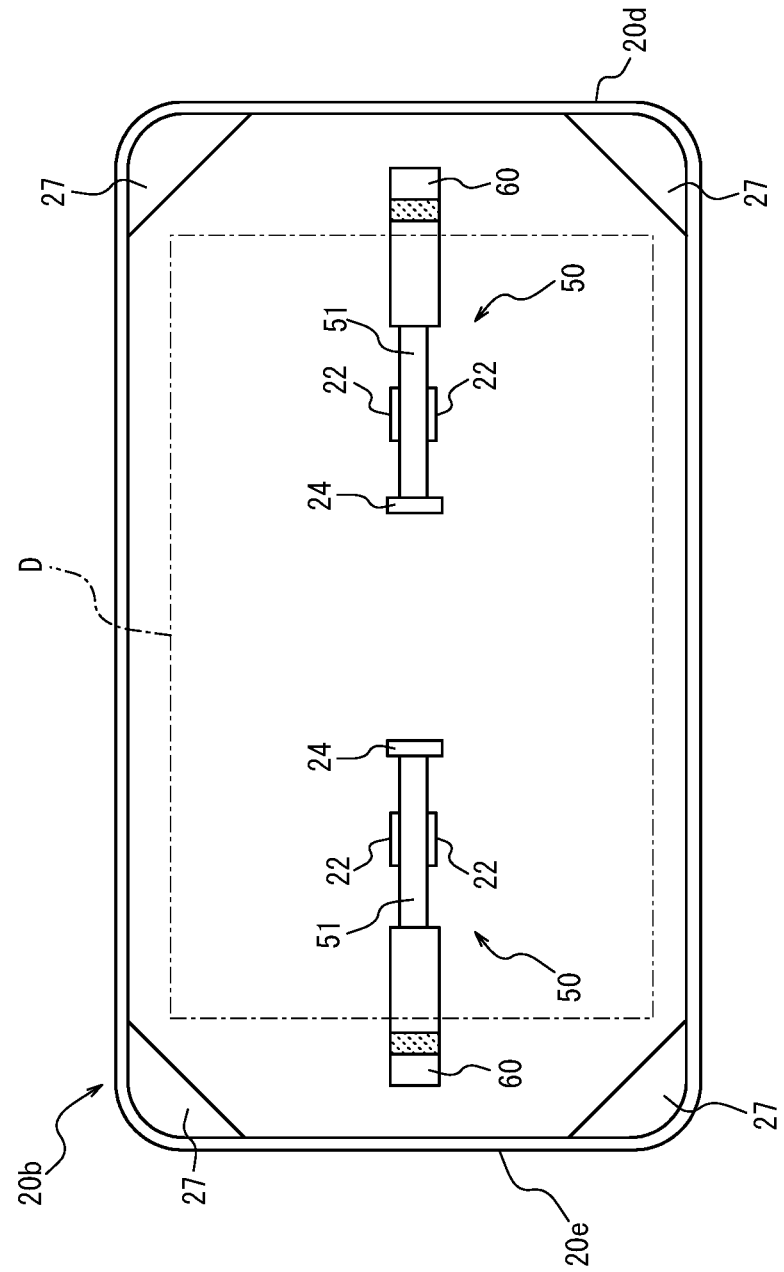

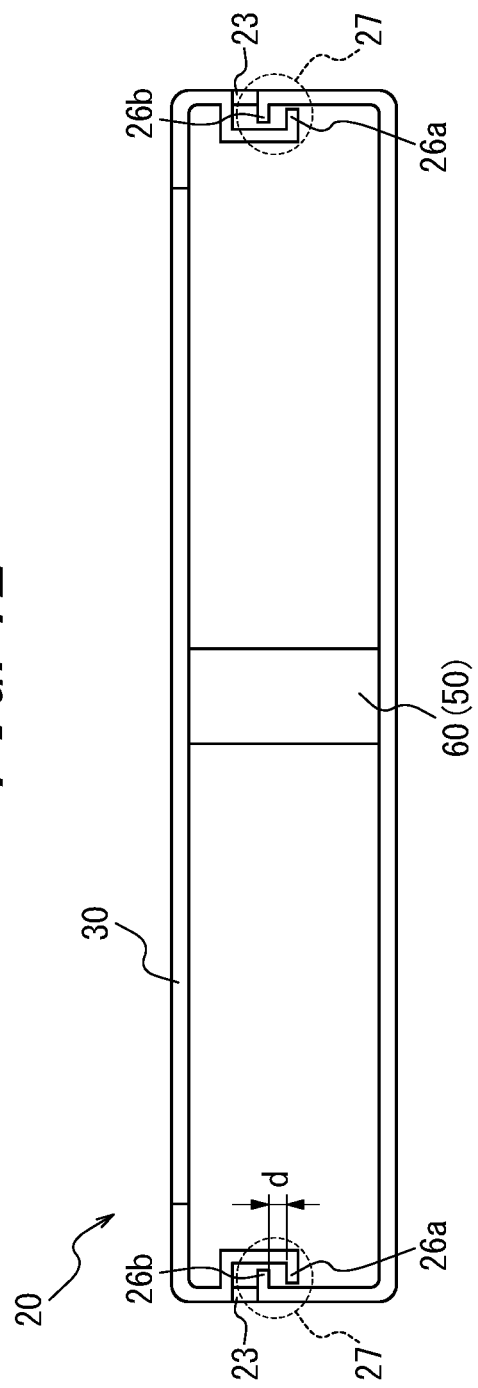

TACTILE SENSATION PROVIDING DEVICE

CROSS-REFERENCE TO RELATED APPLICATION

The present application claims priority to and the benefit of Japanese Patent Application No. 2014-229420 filed Nov. 12, 2014, and Japanese Patent Application No. 2014-229421 filed Nov. 12, 2014, the entire contents of which are incorporated herein by reference.

TECHNICAL FIELD

The present disclosure relates to a tactile sensation providing device.

BACKGROUND

For example, there is conventionally known a technique for providing a realistic tactile sensation to a contacting object, such as a finger, on a touch panel or other such panel.

SUMMARY

A tactile sensation providing device comprises a panel; an actuator; and a conversion unit that engages with the panel and the actuator and that, in response to displacement of the actuator, converts a displacement direction and a displacement amount of the actuator to a different displacement direction and a different displacement amount and displaces the panel according thereto, wherein the displacement direction of the panel is a thickness direction of the panel, and the displacement direction of the actuator intersects with the displacement direction of the panel.

A tactile sensation providing device includes a panel; an actuator that displaces the panel in a thickness direction of the panel; and a regulator that regulates displacement of the panel.

BRIEF DESCRIPTION OF THE DRAWINGS

In the accompanying drawings:

FIG. 4 illustrates operation of the conversion unit in FIG. 3;

FIG. 9 is a plan view illustrating an example of arrangement of actuators in a tactile sensation providing device according to Embodiment 3 of the present disclosure;

FIG. 12 illustrates a structure of regulators included in a tactile sensation providing device in FIG. 9;

DETAILED DESCRIPTION

Conventionally known tactile sensation providing devices sometimes have difficulty in providing favorable tactile sensations due to limited amounts of displacement of the vibrated panels and insufficient transmission of the vibration of the panels to users, depending on the configurations of vibrators that vibrate the panels. There is room for improvement in terms of device configurations. The present disclosure has been conceived in view of the above circumstance, and the present disclosure is to provide an improved tactile sensation providing device.

The following describes embodiments with reference to the drawings.

Embodiment 1

Figure 1:
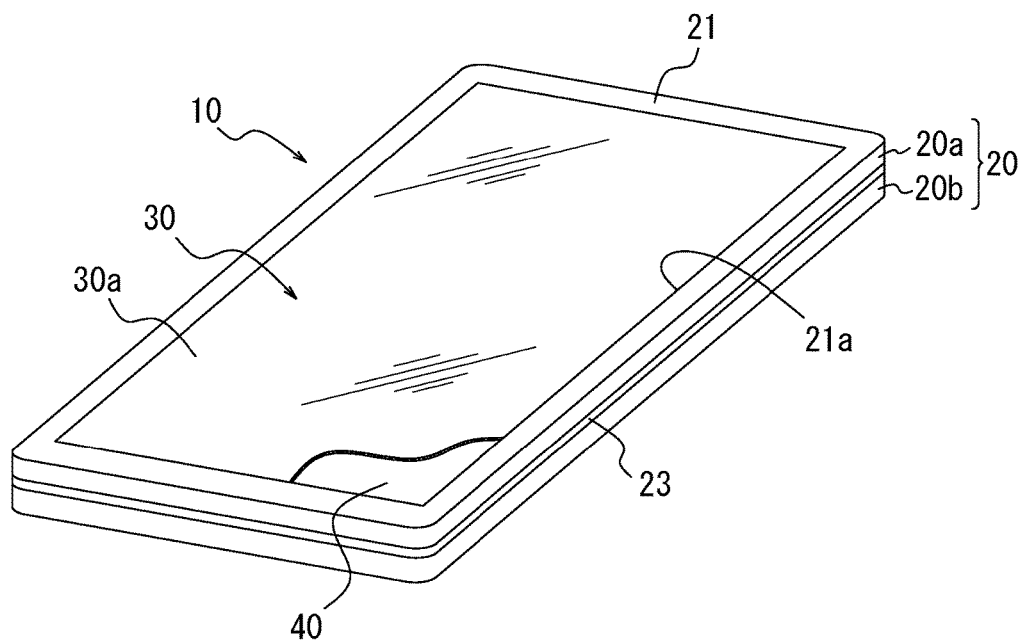
FIG. 1 is an external perspective view schematically illustrating the structure of a tactile sensation providing device according to Embodiment 1 of the present disclosure.

FIG. 1 is an external perspective view schematically illustrating the structure of a tactile sensation providing device according to Embodiment 1 of the present disclosure. The tactile sensation providing device 10 may be implemented as an electronic device having other functions, such as a mobile phone, including a smartphone, a portable music player, a laptop computer, a wristwatch, a tablet, and a game device, or the like.

The tactile sensation providing device 10 according to the present embodiment includes a housing 20, whose external shape is substantially rectangular. The housing 20 includes an upper housing 20a and a lower housing 20b. The upper housing 20a and the lower housing 20b are joined by a joining portion 23, which is configured by an elastic member, to form the single housing 20. The joining portion 23 may also be configured as a waterproof tape, sponge, or the like. The upper housing 20a and the lower housing 20b are joined via the joining portion 23 in a manner such that the housings 20a and 20b are displaceable relative to each other. The upper housing 20a and the lower housing 20b may be displaceable along a guide which restricts the displacement direction to the thickness direction of the housing 20.

The housing 20 is formed by metal, rigid plastic, or the like. In the upper housing 20a, a panel 30 is arranged on the side of a surface 21 of the housing 20. Furthermore, as illustrated by partially cutting out the panel 30 in FIG. 1, a display 40 is held beneath the panel 30 inside the housing 20. The housing 20 includes, inside thereof, actuators and conversion units.

The panel 30 is a touch panel that detects contact, a cover panel that protects the display 40, or the like. The panel 30 is, for example, made from glass or a synthetic resin such as acrylic or the like. The panel 30 is, for example, formed to be rectangular. When the panel 30 is a touch panel, the panel 30 detects contact by a contacting object such as the operator's finger, a pen, a stylus pen, or the like. Any known detection system may be used in the touch panel, such as a capacitive system, a resistive film system, a surface acoustic wave system (or an ultrasonic wave system), an infrared system, an electromagnetic induction system, a load detection system, or the like. In the present embodiment, for the sake of explanation, the panel 30 is assumed to be a touch panel. In this case, the panel 30 and the display 40 may be configured integrally. The panel 30, except for a periphery of a panel front surface 30a thereof, is exposed from an opening 21a, which is formed on the surface 21 of the housing 20.

The display 40 is configured by using, for example, a liquid crystal display, an organic EL display, an inorganic EL display, an electronic paper, or the like. The display 40 displays an object, such as an image (page), an icon, and a push button, to be inputted, in application software (hereinafter, simply called the "application"), such as a browser and an e-book.

Figure 2:
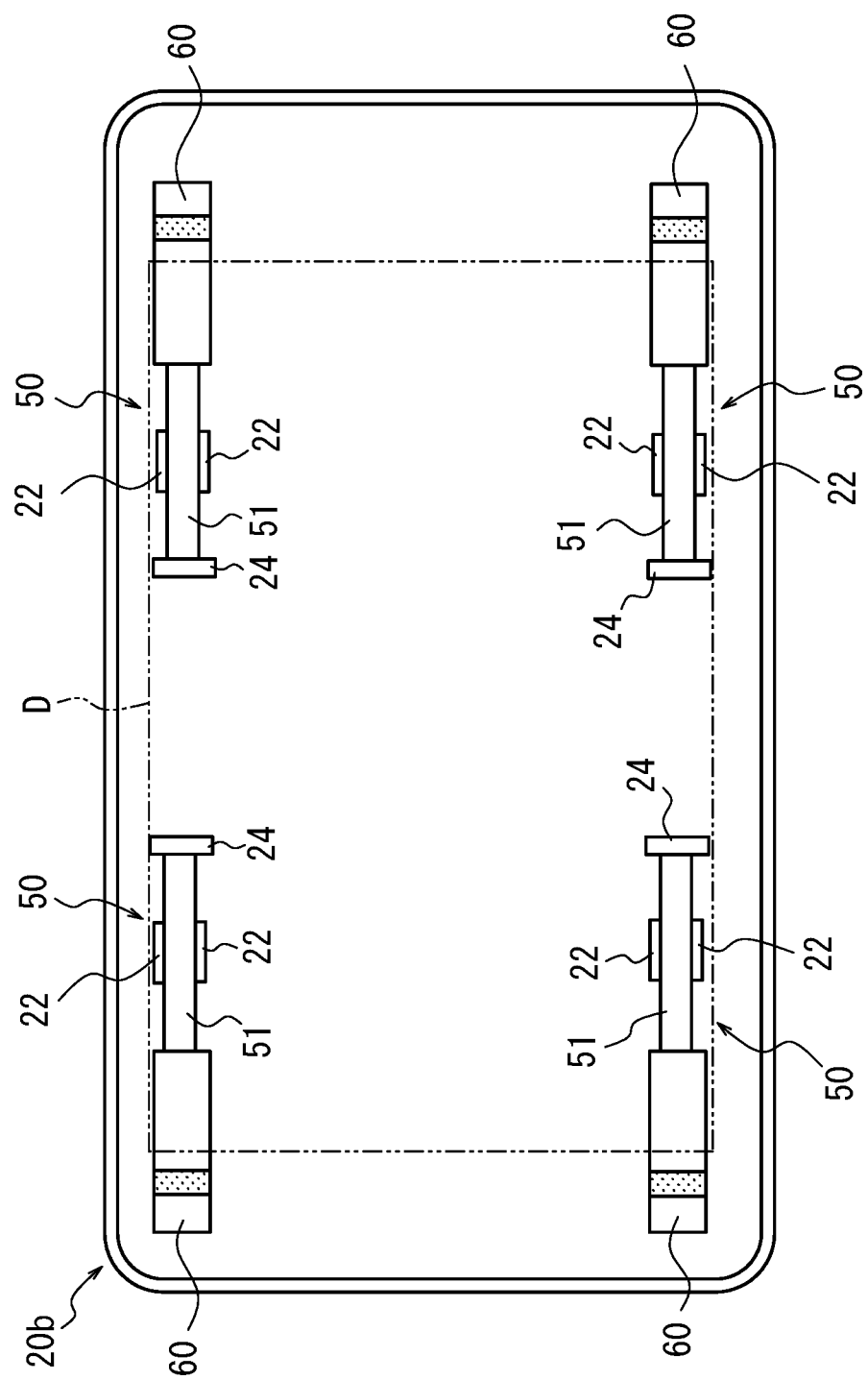
FIG. 2 is a plan view illustrating an example of arrangement of actuators in a tactile sensation providing device in FIG. 1.

FIG. 2 is a plan view illustrating an example of arrangement of actuators in the lower housing 20b, with the upper housing 20a being omitted. As illustrated in FIG. 2, four actuators 50 are arranged in the lower housing 20b. The actuators 50 constitute a driving source for displacing the panel 30 and are each configured by using, for example, a piezoelectric element 51. The piezoelectric element 51 is an element that undergoes expansion and contraction or bending displacement in accordance with an electromechanical coupling factor of a constituent material in response to an electric signal (voltage) applied thereto. As a material of the piezoelectric element 51, ceramic and crystal are used, for example. The piezoelectric element 51 may be a unimorph, a bimorph, or a laminated-type piezoelectric element. Examples of the laminated-type piezoelectric element may include a laminated bimorph element in which layers of bimorph are laminated, a stacked laminated-type piezoelectric element that is configured, for example, by a laminated structure of a plurality of dielectric layers made of lead zirconate titanate (PZT) and electrode layers each arranged between adjacent ones of the plurality of dielectric layers. Unimorph undergoes displacement through expansion and contraction in response to an electric signal applied thereto, and bimorph undergoes bending displacement in response to an electric signal applied thereto. A stack laminated-type piezoelectric element undergoes displacement through expansion and contraction in the laminated direction in response to an electric signal applied thereto. In the present embodiment, the piezoelectric element 51 is a stack laminated-type piezoelectric element.

The piezoelectric element 51 is arranged to extend substantially in parallel with the longitudinal direction of the lower housing 20b, with one end portion of the piezoelectric element 51 being fixed to a fix portion 24, which is included in the lower housing 20b. The fix portion 24 is arranged closer to the middle of the lower housing 20b with respect to the direction in which the piezoelectric element 51 extends. Accordingly, the piezoelectric element 51 is displaced through expansion and contraction substantially in parallel with the longitudinal direction of the lower housing 20b. To guide the displacement through expansion and contraction of the piezoelectric element 51, a pair of guide members 22 is arranged in the lower housing 20b to sandwich the piezoelectric element 51.

The piezoelectric element 51 has, on another end side thereof that is not fixed to the fix portion 24, an end surface that engages with a conversion unit 60. Concrete structure of the conversion unit 60 will be described in detail in the description of FIG. 3. In the lower housing 20b, the conversion units 60 are held to engage with the panel 30 in the vicinity of four corners of the lower housing 20b that is outside a display region D, represented by a virtual line in FIG. 2, of the display 40. In FIG. 2, a portion of each conversion unit 60 that engages with the panel 30 is represented by a shaded region in a portion of the conversion unit 60.

Figure 3:
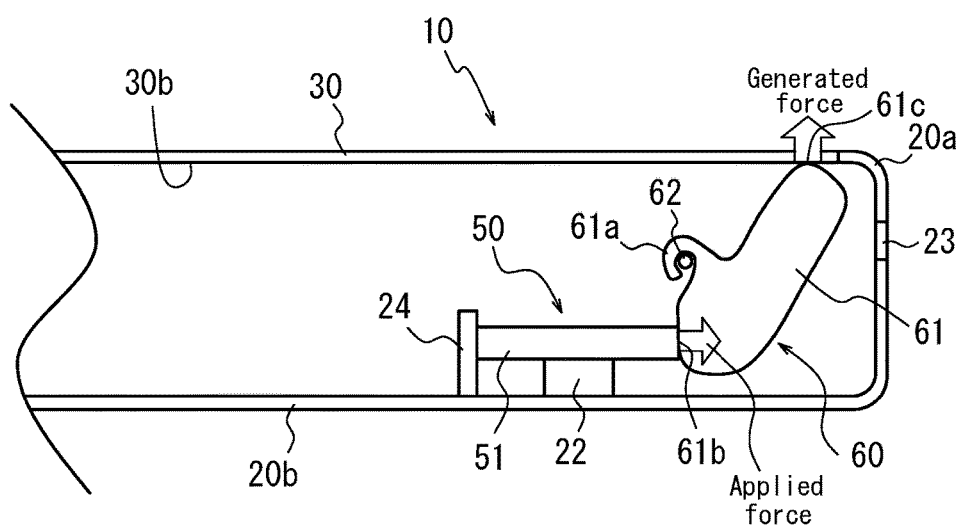
FIG. 3 is a sectional view illustrating a schematic structure of a section of a tactile sensation providing device in FIG. 1.

FIG. 3 is a sectional view illustrating a schematic structure of a part of the tactile sensation providing device 10. The piezoelectric element 51 is supported by the guide members 22 in the bottom of the lower housing 20b. The conversion unit 60 is arranged to engage with a panel rear surface 30b of the panel 30 that is located on the inner side of the housing 20 and with the end surface on the other end of the piezoelectric element 51. In response to displacement through expansion and contraction of the piezoelectric element 51, the conversion unit 60 converts a displacement direction and a displacement amount of the piezoelectric element 51 to a different displacement direction and a different displacement amount and displaces the panel 30 according thereto. In the present embodiment, the conversion unit 60 includes a rotary member 61. The rotary member 61 includes a latch 61a that rotatably latches onto a fixed axle 62, an abutment 61b, and an abutment 61b abutted by the piezoelectric element 51, and an abutment 61c abutted by the panel rear surface 30b of the panel 30. The latch 61a is shaped as a hook, and the abuts 61b and 61c are formed as projections.

The panel 30 is supported by the upper housing 20a and engaged while applying pressure to the conversion unit 60 in the inward direction (downward direction in FIG. 3) of the housing 20 at the abut 61c due to elastic force of the joining portion 23. The actuator 50 and the conversion unit 60 are supported by the lower housing 20b and engaged while the conversion unit 60 applies pressure to the actuator 50 at the abut 61b.

In FIG. 3, when the piezoelectric element 51 is displaced to expand in the right direction, the rotary member 61 is rotated counterclockwise about the fixed axle 62. Consequently, the displacement direction of the piezoelectric element 51 is converted substantially 90 degrees by the conversion unit 60, and the converted displacement direction is transmitted to the panel 30, thereby displacing the panel 30, together with the upper housing 20a, upward against elastic force of the joining portion 23. That is to say, the displacement direction of the panel 30 is the thickness direction of the panel 30. Furthermore, the displacement direction of the piezoelectric element 51 undergoing expansion and contraction intersects with the displacement direction of the panel 30 in a side view of the tactile sensation providing device 10.

Now, with reference to FIG. 4, a description is given of the action of the conversion unit 60. FIG. 4 is an enlarged view of the conversion unit 60. In FIG. 4, the fulcrum represents the fixed axle 62, with which the latch 61a of the rotary member 61 latches, the point of effort represents the abut 61b of the rotary member 61, against which the piezoelectric element 51 abuts, and the point of load represents the abut 61c, against which the panel rear surface 30b of the panel 30 abuts. When an applied displacement amount and an applied force that are applied to the point of effort in response to displacement of the piezoelectric element 51 are respectively S and T, an displacement amount and a generated force that act on the point of load are respectively D and F, a distance from the fixed axle 62, which serves as the fulcrum, to the point of effort is L1, and a distance from the fulcrum to the point of load is L2, the displacement amount D and the generated force F are approximated as the following formulae (1) and (2). Note that L1 and L2 are sufficiently greater than S and D, respectively.

$$D=S\times L2/L1 \quad (1)$$

$$F=T\times L1/L2 \quad (2)$$

From the formulae (1) and (2), the displacement amount D and the generated force F that are sufficient to provide tactile sensation are achieved by appropriately setting the positions of the point of effort and the point of load, that is to say, the distances L1 and L2. Generally, in the laminated-type piezoelectric element 51, the applied force T is large, and the applied displacement amount S is small. Accordingly, the common piezoelectric element 51 sometimes has difficulty in providing tactile sensation that an operator may detect comfortably. However, in the present embodiment, the conversion unit 60 makes the displacement amount D of the panel 30, which provides tactile sensation, greater than the applied displacement amount S. This allows the tactile sensation providing device 10 to provide favorable tactile sensation more easily.

The angle that the displacement direction of the piezoelectric element 51 undergoing expansion and contraction forms with respect to the displacement direction of the panel 30, that is to say, the angle by which the displacement direction of the piezoelectric element 51 undergoing expansion and contraction is converted, is not limited to 90 degrees and may be determined at will.

On the other hand, as illustrated in FIG. 4, a resistance A (=T) provided by the piezoelectric element 51 as a generator of force, a resistance B (=F) provided by the panel 30 as an object to be moved, and a resistance C (=$(T^2+F^2)^{1/2}$) serving to attain balance between the resistance A and the resistance B are generated in the rotary member 61. That is to say, by setting the position of the fixed axle 62 so that the resistance A and the resistance B are always generated, the position of the rotary member 61 is determined from the balance between the three resistances A, B, and C. This means that there is no need for the rotary member 61 to be held by the fixed axle 62 tightly. Accordingly, flexibility in shape of the rotary member 61 is improved by, for example, allowing the rotary member 61 to be shaped as illustrated in FIGS. 5A to 5C instead of FIG. 4, and ease of assembly of the conversion unit 60 is improved.

Figure 5A:
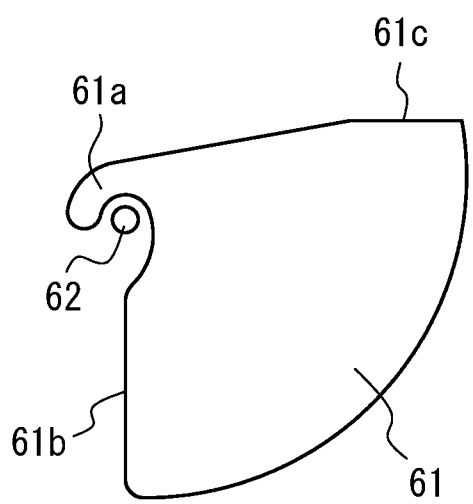
FIG. 5A illustrates a modification to the conversion unit in FIG. 3.
Figure 5B:
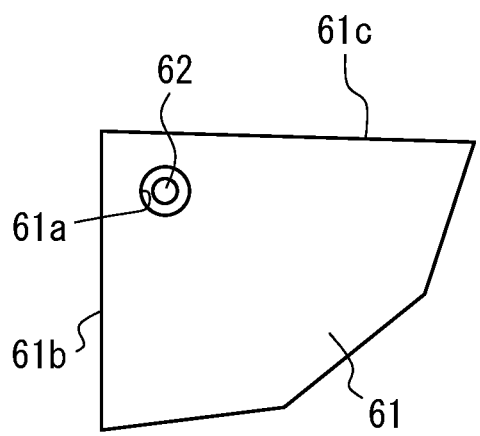
FIG. 5B illustrates a modification to the conversion unit in FIG. 3.
Figure 5C:
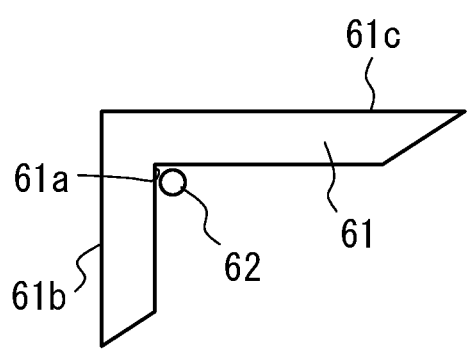
FIG. 5C illustrates a modification to the conversion unit in FIG. 3.

The rotary member 61 illustrated in FIG. 5A includes the hook-shaped latch 61a and the abuts 61b and 61c, which are formed on both side surfaces of the fan shape. The rotary member 61 illustrated in FIG. 5B has a polygonal shape that is generally fan-shaped and includes the latch 61a, which is formed in a vertical angle portion of the fan shape as an opening having a diameter greater than that of the fixed axle 62, and the abuts 61b and 61c, which are formed on both side surfaces of the fan shape. The rotary member 61 illustrated in FIG. 5C generally has an L-shape and includes the latch 61a, which is formed by an interior angle portion of the L-shape, and the abuts 61b and 61c, which are formed on outer surfaces.

Furthermore, with the resistance A and the resistance B always acting on the rotary member 61, even when friction occurs in the engagement portion between the rotary member 61 and the fixed axle 62, L1:L2, that is to say, D:S and T:F, are maintained substantially constant. This allows the panel 30 to be displaced reliably for a long period at initial conditions without being affected by friction.

The tactile sensation providing device 10 according to the present embodiment causes the piezoelectric element 51 to undergo displacement through expansion and contraction by detecting a contact or pressing on the panel 30 by an operator's finger, or a contacting object, such as a pen or a stylus pen. The panel 30 is displaced accordingly, and tactile sensation is fed back to an operator.

The piezoelectric element 51 in the present embodiment also serves as a pressure detector that detects pressure that an operator applies to the panel 30. With reference to FIG. 3 again, a description is given of the function of the piezoelectric element 51 as the pressure detector. The tactile sensation providing device 10 may also include a pressure detector, such as a piezoelectric element or a strain sensor that detects pressure, in addition to the piezoelectric element 51.

When an operator makes an input operation to the tactile sensation providing device 10, which is configured as an electronic device such as a mobile phone, pressure by the input operation is inputted to the panel 30. As the upper housing 20a, in which the panel 30 is arranged, is displaced toward the lower housing 20b against elastic force of the joining portion 23, which is configured by the elastic member, the abut 61c is displaced downward. Consequently, the rotary member 61 is rotated clockwise about the fixed axle 62. Thus, the displacement direction by the panel 30 is converted substantially 90 degrees by the conversion unit 60, and the converted displacement direction is transmitted to the piezoelectric element 51, thereby causing the piezoelectric element 51 to be displaced to contract in the left direction.

The piezoelectric element 51 outputs the magnitude of voltage (a voltage value, which is hereinafter called data based on pressure), which represents electric properties in accordance with the amount of load (force) (or the rate, namely, an acceleration, at which the amount of load or force changes) pertaining to pressure from the abut 61b. The data based on pressure, outputted from the piezoelectric element 51, is transmitted to a controller of the tactile sensation providing device 10, and thus, it is detected that the pressure (input) corresponding to the data has been applied (made). In this way, the piezoelectric element 51 may be used for providing tactile sensation and detecting pressure.

Figure 6:
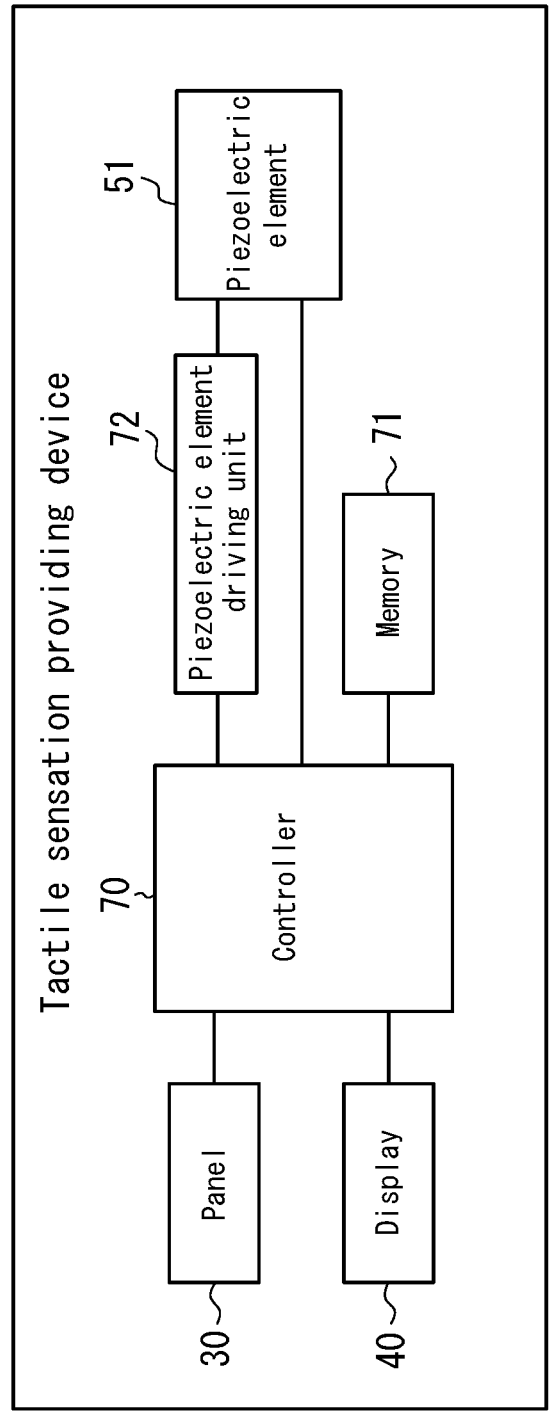
FIG. 6 is a functional block diagram illustrating the circuit structure of a section of the tactile sensation providing device in FIG. 1.

FIG. 6 is a functional block diagram illustrating the circuit structure of a section of the tactile sensation providing device 10 in FIG. 1. The tactile sensation providing device 10 includes a controller 70, a memory 71, a piezoelectric element driving unit 72, as well as the panel 30, the display 40, and the piezoelectric element 51 described above.

The controller 70 is a processor that controls and manages the whole tactile sensation providing device 10 including the functional blocks. The controller 70 may be a processor, such as a central processing unit (CPU), that executes a program prescribing control procedures. The program may be stored in, for example, the memory 71 or an external storage medium.

The memory 71 may be configured by a semiconductor memory, and the memory 71 serves to store a variety of information, a program used to operate the tactile sensation providing device 10, and so forth and also serves as a work memory.

Based on a control signal from the controller 70, the piezoelectric element driving unit 72 generates an electric signal to be applied to the piezoelectric element 51 and applies the generated electric signal to the piezoelectric element 51.

The display 40 displays an object, such as an image (page), an icon, and a push button, to be inputted in the application under the control of the controller 70. The panel 30 detects a contact made to the object displayed on the display 40 by a contacting object. The output from the panel 30 is fed to the controller 70, and the position of the contact on the panel 30 by the contacting object is detected.

Based on the output from the panel 30, the controller 70 detects the contact made to the object that is displayed on the display 40 to be inputted by the contacting object. When determining that the pressing load to the panel 30 has reached a predetermined value based on the output (data based on pressure) from the piezoelectric element 51, the controller 70 controls the piezoelectric element driving unit 72 to drive the piezoelectric element 51 in a predetermined driving pattern. The driven piezoelectric element 51 displaces the panel 30 and accordingly, provides an operator with the tactile sensation of having operated the object to be inputted.

The driving pattern of the piezoelectric element 51 may be stored in the memory 71, for example, in correspondence with the object to be inputted for which the contact by the contacting object has been detected. For example, when the tactile sensation of having pressed a push button is to be provided, the driving pattern of displacing the panel 30 downward and upward may be provided by applying, to the piezoelectric element 51, a pulsed driving voltage of one-half a cycle of a predetermined frequency. Alternatively, depending on the object to be inputted, the driving pattern of displacing the panel 30 downward and upward several times may be provided by applying, to the piezoelectric element 51, a driving voltage of a plurality of cycles of a predetermined frequency.

The tactile sensation providing device 10 according to the present embodiment permits the conversion of displacement of the piezoelectric element 51 through expansion and contraction in parallel with the panel 30 into the displacement of the panel 30 in the thickness direction. At this time, the displacement amount of the piezoelectric element 51 is converted to a greater displacement amount by the conversion unit 60, and the panel 30 is displaced according thereto. Accordingly, compared with cases where the piezoelectric element 51 is arranged in the thickness direction of the device, the panel 30 is displaced by the greater displacement amount and more likely to provide favorable tactile sensation in the thickness direction. Furthermore, with the piezoelectric element 51 serving as the pressure detector, the structure of the device is simplified compared with cases where the piezoelectric element 51 to detect pressure to the panel 30 needs to be provided additionally. Moreover, since there is no need for the rotary member 61 to be held by the fixed axle 62 tightly, flexibility in shape of the rotary member 61 is improved, ease of assembly of the conversion unit 60 is improved, and the panel 30 is displaced reliably for a long period at initial conditions without being affected by friction occurring in the engagement portion between the rotary member 61 and the fixed axle 62.

Additionally, the piezoelectric element 51 is arranged along the longitudinal direction of the housing 20, that is to say, arranged in a manner such that the displacement direction of the piezoelectric element 51 intersects with the displacement direction of the panel 30 in the side view of the tactile sensation providing device 10. This helps reduce the dimension of the housing 20 in the thickness direction and allows downsizing. Besides, the tactile sensation providing device 10 includes the four piezoelectric elements 51, and the conversion units 60 engaged with the piezoelectric elements 51 contact the panel 30 in the vicinity of the four corners of the housing 20. Accordingly, tactile sensation providing device 10 provides tactile sensation by displacing the entire panel 30. This allows the tactile sensation providing device 10 to provide favorable tactile sensation with less force compared with cases where tactile sensation is provided by bending the panel 30.

Embodiment 2

Figure 7:
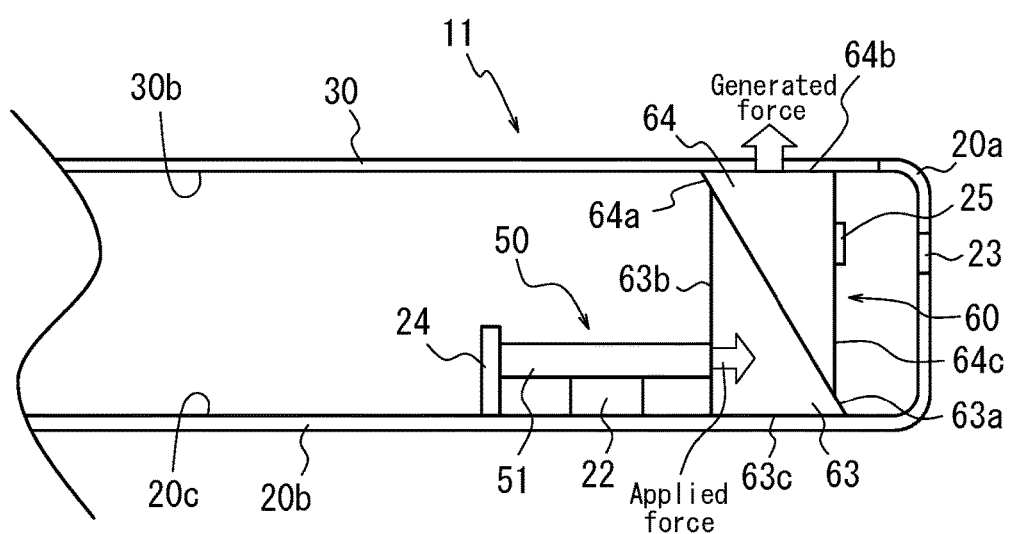
FIG. 7 is a sectional view schematically illustrating the structure of a section of a tactile sensation providing device according to Embodiment 2 of the present disclosure.

FIG. 7 is a plan view schematically illustrating the structure of a section of a tactile sensation providing device according to Embodiment 2 of the present disclosure. FIG. 7 corresponds to FIG. 3. A tactile sensation providing device 11 according to the present embodiment differs from the tactile sensation providing device 10 according to Embodiment 1 in terms of the structure of each conversion unit 60. In the description below, the same components as in Embodiment 1 are assigned with the same reference numerals, and the difference is explained.

In FIG. 7, the conversion unit 60 includes a linear motion member 63 and a sliding member 64. The linear motion 63 has a wedge shape including an inclined face 63a, which extends in a direction intersecting with the displacement direction of the piezoelectric element 51, a side 63b, which is connected to the piezoelectric element 51, and a side 63c, which slides on an inner wall (a bottom surface 20c) of the lower housing 20b. The sliding member 64 has a triangular shape including a sliding face 64a, which slides on the inclined face 63a of the linear motion member 63, a side 64b, which is connected to the panel rear surface 30b of the panel 30, and a side 64c, which extends in the thickness direction of the housing 20 and which slides along a guide member 25, which is provided in the housing 20.

In FIG. 7, when the piezoelectric element 51 is displaced to expand in the right direction, the linear motion member 63 is also guided along the bottom surface 20c of the lower housing 20b to be displaced in the right direction together with the piezoelectric element 51. In conjunction with the displacement of the linear motion member 63 in the right direction, the sliding member 64 slides on the inclined face 63a of the linear motion member 63 to be linearly moved upward in FIG. 7, that is to say, toward the panel 30, along the guide member 25. Consequently, the displacement direction of the piezoelectric element 51 undergoing expansion and contraction is converted substantially 90 degrees by the conversion unit 60, and the converted displacement direction is transmitted to the panel 30, thereby displacing the panel 30 upward against elastic force of the joining portion 23.

Figure 8A:
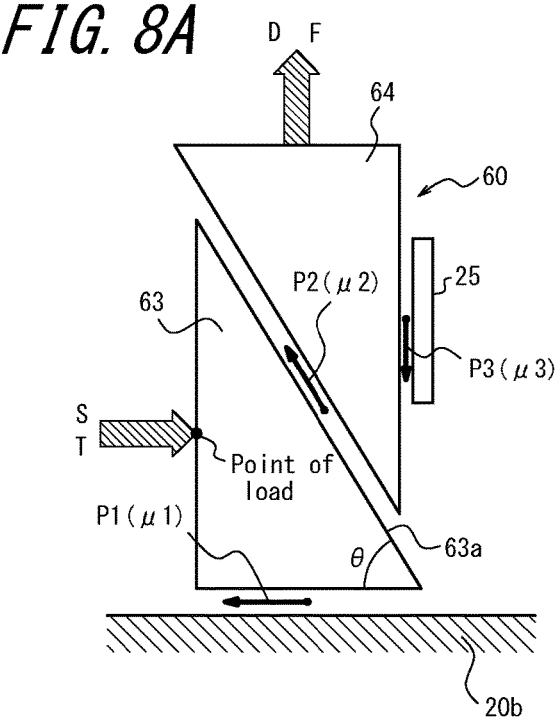
FIG. 8A illustrates operation of the conversion unit in FIG. 7.
Figure 8B:
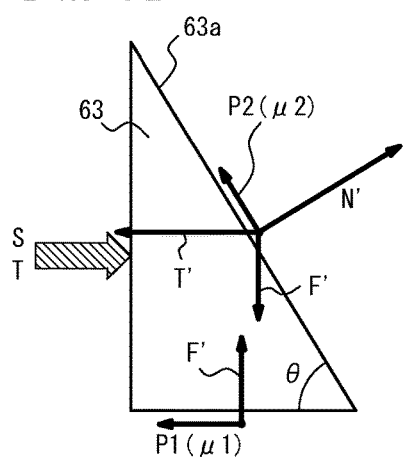
FIG. 8B illustrates operation of the conversion unit in FIG. 7.
Figure 8C:
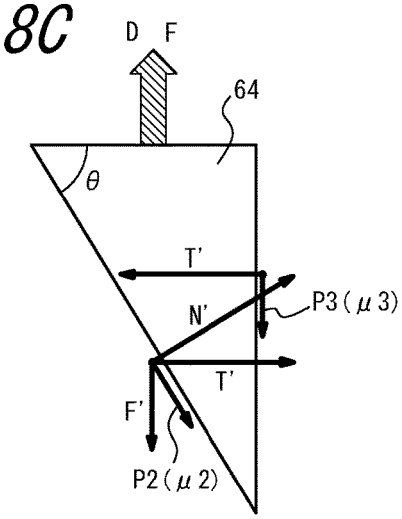
FIG. 8C illustrates operation of the conversion unit in FIG. 7.

Now, with reference to FIGS. 8A to 8C, a description is given of the operation of the conversion unit 60. FIG. 8A is an enlarged view of the conversion unit 60, FIG. 8B is an enlarged view of the linear motion member 63, and FIG. 8C is an enlarged view of the sliding member 64. In FIG. 8A, an applied displacement amount and an applied force that are applied to the point of effort in the linear motion member 63 in response to displacement of the piezoelectric element 51 are respectively S and T, an displacement amount and a generated force that are applied to the sliding member 64 (panel 30) from the point of load of the linear motion member 63 are respectively D and F, and an angle that the inclined face 63a forms with respect to the displacement direction of the linear motion member 63 is θ. In this example, the displacement amount D is represented by the following formula (3).

$$D = S \times \tan\theta \quad (3)$$

On the other hand, a friction force between the linear motion member 63 and the bottom surface 20c of the lower housing 20b as the guide is P1, the coefficient of friction therebetween is µ1, a friction force between the linear motion member 63 and the sliding member 64 is P2, the coefficient of friction therebetween is µ2, a friction force between the sliding member 64 and the guide member 25 is P3, the coefficient of friction therebetween is µ3, and an applied force and a generated force that take friction into consideration are respectively T' and F'. In this example, as illustrated in FIG. 8B, friction forces P1 and P2 act on the linear motion member 63. These friction forces P1 and P2 are represented by the following formulae. Note that N represents a resultant force of the applied force T' and the generated force F' that acts in a normal direction of the inclined face 63a.

$$P1 = \mu 1 \times F'$$

$$P2 = \mu 2 \times N' = \mu 2 \times T'/\sin\theta$$

Accordingly, the applied force T in this example is defined by the following formula (4).

$$\begin{aligned}
T &= T' + P1 + P2 \times \cos\theta \quad (4)\\
&= T' + \mu 1 \times F' + \mu 2 \times T'/\sin\theta \times \cos\theta\\
&= T' + \mu 1 \times T' \times \cot\theta + \mu 2 \times T' \cot\theta\\
&= T' \times (1 + \mu 1 \cot\theta + \mu 2 \cot\theta)
\end{aligned}$$

As illustrated in FIG. 8C, the friction forces P2 and P3 act on the sliding member 64. These friction forces P2 and P3 are represented by the following formulae.

$$P2 = \mu 2 \times N' = \mu 2 \times T'/\sin\theta$$

$$P3 = \mu 3 \times T'$$

Accordingly, the generated force F in this example is defined by the following formula (5).

$$\begin{aligned}
F &= F' - P3 - P2 \times \sin\theta \quad (5)\\
&= T'/\tan\theta - \mu 3 \times T' - \mu 2 \times T'\\
&= T' \times (\cot\theta - \mu 2 - \mu 3)
\end{aligned}$$

From the formulae (4) and (5), the generated force F acting on the panel 30 due to the applied force T by the piezoelectric element 51 is represented by the following formula (6).

$$F = T \times (\cot\theta - \mu 2 - \mu 3)/(1 + \mu 1 \cot\theta + \mu 2 \cot\theta) \quad (6)$$

When there is no friction, $F = T \times \cot\theta$. When the coefficients of friction are all the same ($\mu$), $F = T \times (\cot\theta - 2\mu)/(1 + 2\mu\cot\theta)$.

When the tactile sensation proving device 11 is placed on a horizontal surface, such as a desk, in use, the aforementioned effect of gravity needs to be taken into consideration.

In Embodiment 2, similarly to Embodiment 1, the piezoelectric element 51 may serve as the pressure detector. When an operator makes an input operation to the tactile sensation providing device 11, which is configured as an electronic device such as a mobile phone, pressure by the input operation is inputted to the panel 30. In FIG. 7, when the upper housing 20a, in which the panel 30 is arranged, is displaced toward the lower housing 20b against elastic force of the joining portion 23, which is configured by the elastic member, the sliding member 64 is displaced downward along the guide member 25. Then, the linear motion member 63 slides on the sliding surface 64a to be linearly moved in the left direction, that is to say, in the direction of the piezoelectric element 51, along the bottom surface 20c of the lower housing 20b. Thus, the displacement direction by the panel 30 is converted substantially 90 degrees by the conversion unit 60, and the converted displacement direction is transmitted to the piezoelectric element 51, thereby causing the piezoelectric element 51 to be displaced to contract in the left direction. The piezoelectric element 51 transmits, to the controller of the tactile sensation providing device 11, the data based on pressure, and thus, the pressure is detected in the controller.

According to the present embodiment, from the above formulae (3) and (6), the displacement amount D and the generated force F that are sufficient to provide tactile sensation are achieved by appropriately setting the angle θ that the inclined face 63a forms with respect to the displacement direction of the linear motion member 63. Accordingly, similarly to Embodiment 1, favorable tactile sensation in the thickness direction is provided easily. Furthermore, since both the linear motion member 63 and the sliding member 64 are moved linearly, the structure of the tactile sensation providing device 11 according to the present embodiment is further simplified. Other effects are substantially the same as those in Embodiment 1. Additionally, the angle by which the displacement direction is converted by the linear motion member 63 and the sliding member 64 is not limited to 90 degrees and may be any angle.

Embodiment 3

FIG. 9 is a plan view illustrating an example of arrangement of actuators in a tactile sensation providing device according to Embodiment 3 of the present disclosure. FIG. 9 corresponds to FIG. 2. As illustrated in FIG. 9, in the tactile sensation providing device 11 according to the present embodiment, two actuators 50 are arranged in the lower housing 20b. In the description below, the same components as in Embodiment 1 are assigned with the same reference numerals, and the difference is explained.

In the present embodiment, the housing 20 includes, inside thereof, regulators 27, which are mechanisms that regulate displacement of the upper housing 20a and the panel 30, arranged in the upper housing 20a. Detail of the inside of the housing 20 is described later.

The piezoelectric elements 51 each has, on the other end side thereof that is not fixed to the fix portion 24, the end surface that engages with the corresponding conversion unit 60. The structure of the conversion unit 60 is substantially the same as that in Embodiment 1. The conversion units 60 engage with the panel 30 at two points between which the center of gravity of the panel 30 is located in the plan view of the housing 20 (tactile sensation providing device 10). In the lower housing 20b, the conversion units 60 are held to engage with the displacement points in the vicinities of short sides 20d and 20e of the lower housing 20b that are outside the display region D, represented by a virtual line in FIG. 9, of the display 40. In FIG. 9, a portion of each conversion unit 60 that engages with the corresponding displacement portion is represented by a shaded region in a portion of the conversion unit 60. When the piezoelectric element 51 undergoes displacement through expansion and contraction, the displacement through expansion and contraction is transmitted to the displacement point through the conversion unit 60, resulting in displacement of the panel 30.

Figure 10A:
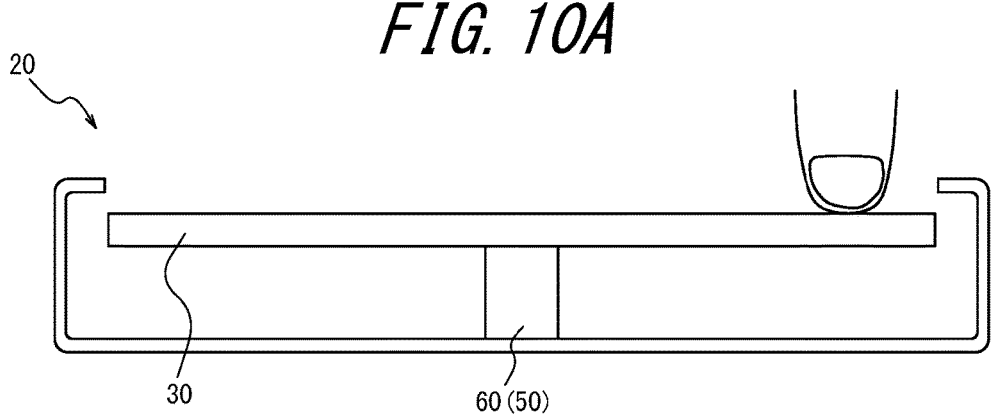
FIG. 10A is a schematic view illustrating displacement of a panel included in a tactile sensation providing device in FIG. 9.
Figure 10B:
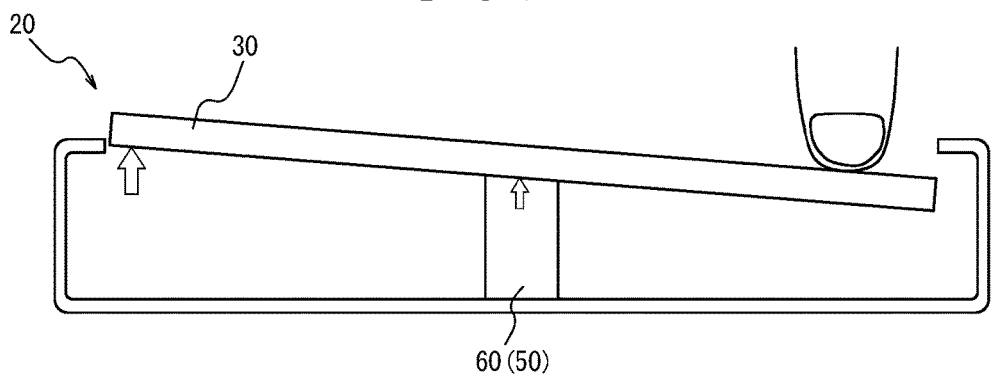
FIG. 10B is a schematic view illustrating displacement of a panel included in a tactile sensation providing device in FIG. 9.

Now, with reference to FIGS. 10A, 10B, 11A, 11B and 11C, a description is given of the function of the regulators 27 included in the tactile sensation providing device 10. FIGS. 10A and 10B are schematic views illustrating displacement of the panel 30 included in the tactile sensation providing device and also are sectional views taken along the direction of a short side of the tactile sensation providing device. FIGS. 10A and 10B especially illustrate displacement of the panel 30 when the tactile sensation providing device does not include the regulators 27.

As illustrated in FIG. 10A, assume, for example, that a user places the finger in contact with a portion of the panel 30 that is located in the vicinity of a long side of the tactile sensation providing device in the state where the actuator 50 is not driven. From this state, when the actuator 50 is driven, and displacement of the actuator 50 is transmitted to the displacement point via the conversion unit 60, as illustrated in FIG. 10B, the panel 30 is pushed up in the thickness direction at the displacement point. At this time, since the portion of the panel 30 that is in contact with the finger is prevented from being displaced in the thickness direction (upward) by the finger, another end side of the panel 30, with respect to the displacement point, is displaced upward, with the portion of the panel 30 that is in contact with the finger as a fulcrum. In this way, the portion of the panel 30 with which the user's finger is placed in contact is hardly deformed in the thickness direction due to the finger preventing the panel 30 from being displaced. Accordingly, even when the actuator 50 is displaced, favorable tactile sensation is unlikely to be provided.

Similarly to FIGS. 10A and 10B, FIGS. 11A to 11C are schematic views illustrating displacement of the panel 30 included in the tactile sensation providing device and also are sectional views taken along the direction of a short side of the tactile sensation providing device. Unlike FIGS. 10A and 10B, FIGS. 11A to 11C illustrate displacement of the panel 30 when the tactile sensation providing device includes the regulators 27. That is to say, the tactile sensation providing device illustrated in FIGS. 11A to 11C includes the regulators 27, which regulate upward displacement of the panel 30 in end portions of the long sides of the panel 30.

Figure 11A:
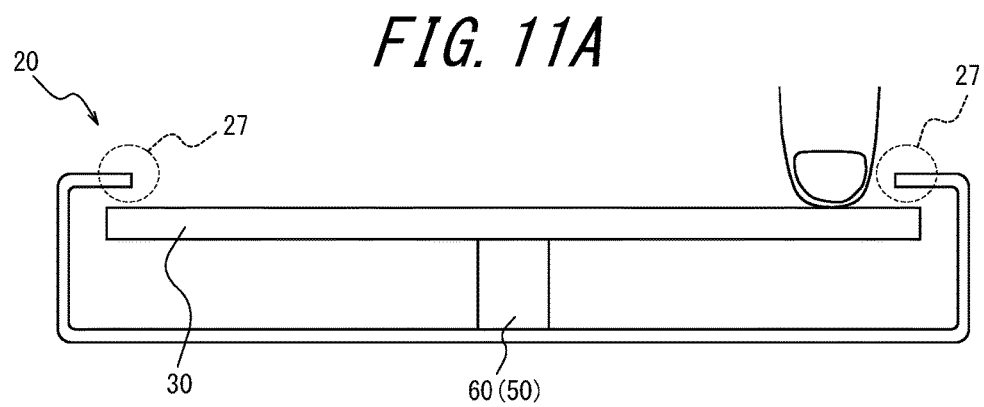
FIG. 11A is a schematic view illustrating displacement of a panel included in a tactile sensation providing device in FIG. 9.
Figure 11B:
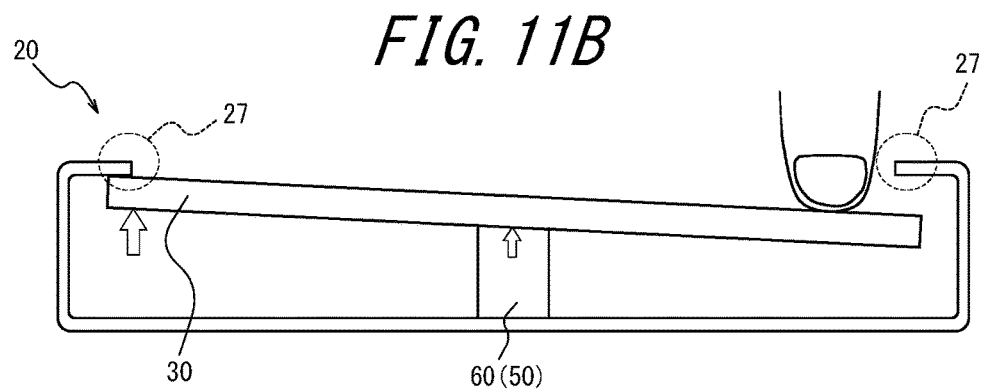
FIG. 11B is a schematic view illustrating displacement of a panel included in a tactile sensation providing device in FIG. 9.
Figure 11C:
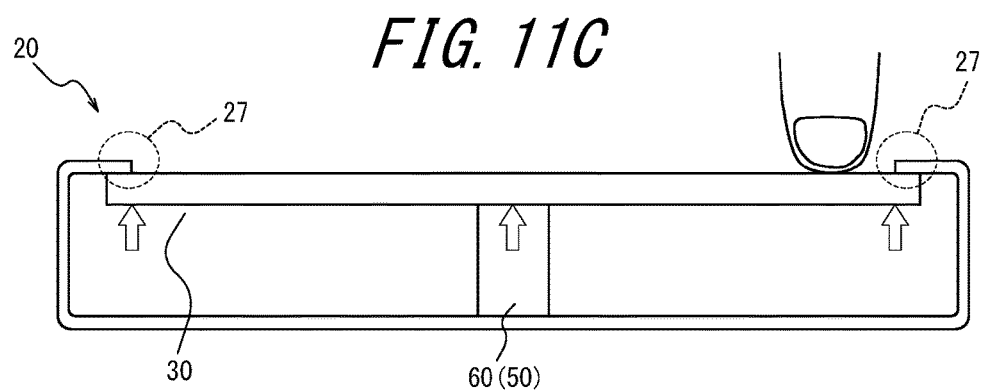
FIG. 11C is a schematic view illustrating displacement of a panel included in a tactile sensation providing device in FIG. 9.

As illustrated in FIG. 11A, assume, for example, that a user places the finger in contact with a portion of the panel 30 that is located in the vicinity of a long side of the tactile sensation providing device in the state where the actuator 50 is not driven on a tactile sensation providing device including regulators 27. From this state, when the actuator 50 is driven, and displacement of the actuator 50 is transmitted to the displacement point via the conversion unit 60, the panel 30 is pushed up in the thickness direction at the displacement point. At this time, since the portion of the panel 30 that is in contact with the finger is prevented from being displaced in the thickness direction (upward) by the finger, another end side of the panel 30, with respect to the displacement point, is displaced upward, with the portion of the panel 30 that is in contact with the finger as a fulcrum. Herein, since the tactile sensation device includes the regulators 27, when the other end side contacts a regulator 27, as illustrated in FIG. 11B, displacement of the panel 30 is regulated on the other end side. Then, as illustrated in FIG. 11C, the portion of the panel 30 that is in contact with the finger is displaced upward, with the other end side in contact with the regulator 27 as a fulcrum. In this way, when the tactile sensation providing device includes the regulators 27, the entire panel 30 is displaced in the thickness direction. Accordingly, regardless of the position in which the finger contacts, favorable tactile sensation is provided easily.

FIG. 12 illustrates the structure the regulators 27 included in the tactile sensation providing device 10 in FIG. 9. Each regulator 27 is configured by hook portions 26a and 26b, which are provided in the upper housing 20a, in which the panel 30 is arranged, and the lower housing 20b in a manner such that the hook portions 26a and 26b may engage with each other. A distance d between the hook portion 26a in the upper housing 20a and the hook portion 26b in the lower housing 20b is set to be greater than the displacement amount of the panel 30 in response to driving of the actuator 50. The upper housing 20a and the lower housing 20b are joined by the joining portion 23, and the joining portion 23 maintains the distance d between the hook portions 26a and 26b to be constant while the actuator 50 is not driven. In response to driving of the actuator 50, the panel 30 is displaced upward against elastic force of the joining portion 23 similarly to the principle illustrated in FIGS. 11A to 11C. The hook portions 26a and 26b regulate displacement of the panel 30 and prevent disengagement of the upper housing 20a and the lower housing 20b.

As illustrated in FIG. 9, the regulators 27 are arranged, for example, in the four corners in a top view of the housing 20. The positions of the regulators 27 are not limited to those illustrated in FIG. 9, and the regulators 27 may be arranged in any positions by which the entire panel 30 is displaceable.

In the present embodiment, due to elastic force of the joining portion 23, the panel 30, which is arranged in the upper housing 20a, applies, to the rotary member 61, pressure urging it in the inward direction of the housing 20 at the abut 61c. Accordingly, the rotary member 61 is abutted while applying pressure to the piezoelectric element 51 at the abut 61b.

According to the tactile sensation providing device 10 in the present embodiment, the regulators 27 regulate displacement of the panel 30 so that the entire panel 30 is displaced. Accordingly, the tactile sensation providing device 10 provides favorable tactile sensation easily regardless of the position on the panel 30 at which the user's finger contacts.

Meanwhile, to displace the entire panel 30 in the tactile sensation providing device that does not include the regulators 27, for example, four actuators 50 need to be arranged in the four corners of the housing 20 to displace the four corners of the panel 30. However, in the tactile sensation providing device 10 according to the present embodiment, since the regulators 27 regulate displacement of the panel 30, the entire panel 30 is displaced by using, for example, two actuators 50. Thus, the tactile sensation providing device 10 according to the present embodiment provides favorable tactile sensation easily even with less number of actuators 50.

Note that the present disclosure is not limited to the embodiments set forth above and may be modified or varied in a multiple ways. For example, in Embodiment 2, each conversion unit 60 may be configured as illustrated in FIG. 13 or 14.

Figure 13:
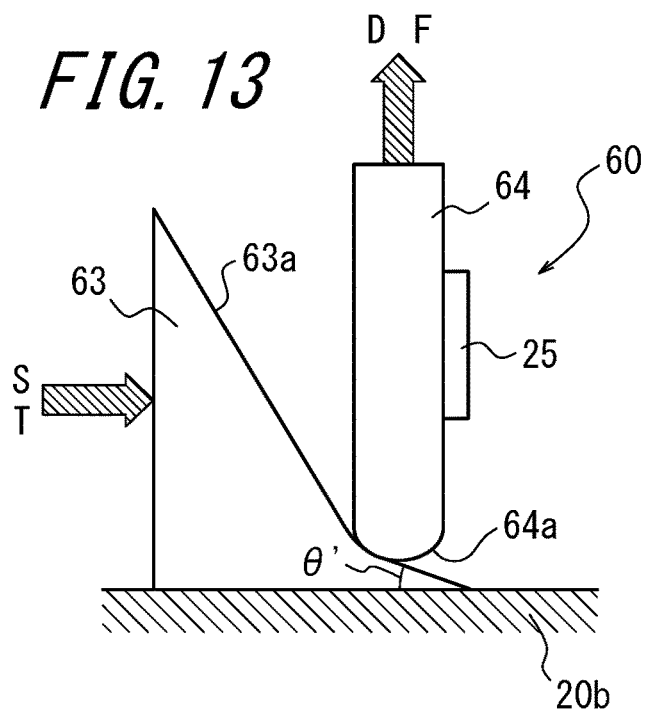
FIG. 13 illustrates a modification of the conversion unit in FIG. 7.

In the conversion unit 60 illustrated in FIG. 13, the inclined face 63a of the linear motion member 63 is formed as a curved surface, and the sliding face 64a of the sliding member 64 is formed as a curved surface in correspondence with the shape of the inclined face 63a. By forming the inclined face 63a of the linear motion member 63 as the curved surface, an angle of a tangent line at the point of load in contact with the sliding member 64 changes in conjunction with displacement of the linear motion member 63. This results in non-linear changes in the displacement amount D and the generated force F with respect to applied displacement.

Accordingly, by, for example, setting an angle θ' in an upper portion of the linear motion member 63 in FIG. 13 to be less than the angle θ illustrated in FIG. 8, although displacement of the sliding member 64 is small in the beginning of application of the applied force T, load due to static friction of the friction force P2 is reduced, and displacement of the sliding member 64 is increased on and after kinetic friction. This allows even smoother displacement of the panel 30.

Figure 14:
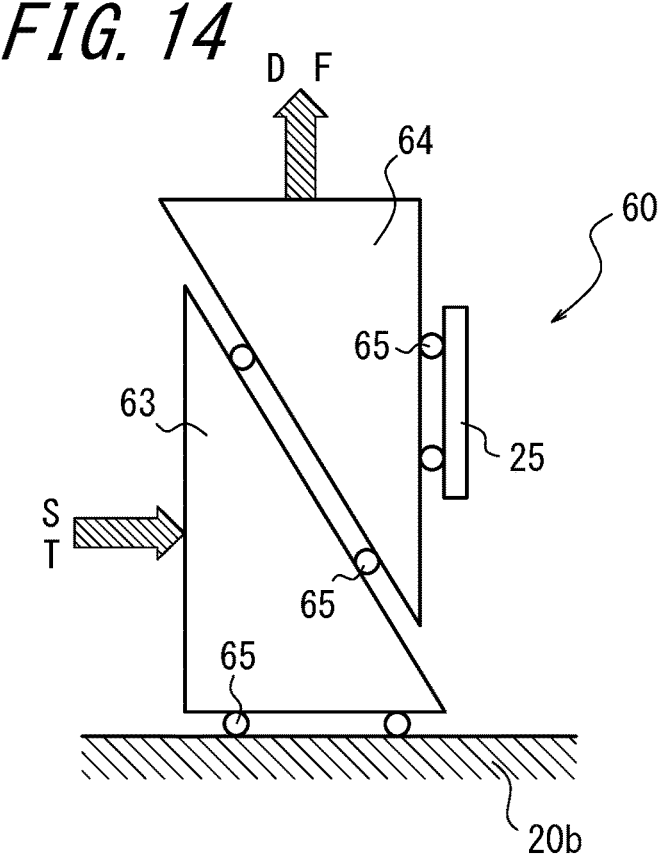
FIG. 14 illustrates another modification of the conversion unit in FIG. 7.

In the conversion unit 60 illustrated in FIG. 14, a plurality of bearings 65 are disposed between the linear motion member 63 and the bottom surface 20c of the lower housing 20b as the guide, between the linear motion member 63 and the sliding member 64, and between the sliding member 64 and the guide member 25. Each bearing 65 may be spherical or columnar. By thus filling the bearings 65 in portions where the friction forces P1, P2, and P3 occur in Embodiment 2, the friction forces are reduced to substantially zero. Accordingly, the panel 30 is displaced even smoother with less applied force T.

Moreover, in, for example, Embodiment 3, the tactile sensation providing device 10 does not necessarily need to include the conversion units 60. In this case, the actuators 50 are arranged to be displaced in the thickness direction of the housing 20.

Moreover, although in Embodiment 3 the number of the actuators 50 is described as two, the number of the actuators 50 is not limited to two. For example, the tactile sensation providing device 10 may include three or more actuators. The tactile sensation providing device 10 may also include only a single actuator 50 in the position corresponding to the center of gravity of the panel 30 in the plan view of the housing 20.

The invention claimed is:

1. A tactile sensation providing device, comprising:
   a panel;
   an actuator; and
   a conversion unit that engages with the panel outside a display region of the tactile sensation providing device and the actuator and that, in response to displacement of the actuator, converts a displacement direction of the actuator and a displacement amount of the actuator to a different displacement direction and a different displacement amount and displaces the panel according thereto, wherein
   the displacement direction of the panel is a thickness direction of the panel,
   the displacement direction of the actuator intersects with the displacement direction of the panel and
   separate elements are used for the actuator and the conversion unit, and the conversion unit is pushed outward with respect to the center of the panel by the actuator.

2. The tactile sensation providing device according to claim 1, wherein the conversion unit includes a rotary member that rotates to displace the panel in response to the displacement of the actuator.

3. The tactile sensation providing device according to claim 1, wherein the conversion unit includes a linear motion member, which has an inclined face extending to intersect with the displacement direction of the actuator and which linearly moves in the displacement direction of the actuator in response to the displacement of the actuator, and a sliding member, which slides on the inclined face to displace the panel in response to displacement of the linear motion member.

4. The tactile sensation providing device according to claim 1, further comprising:
   a housing including an upper housing and a lower housing that are joined by a joining portion having elasticity, wherein
   the panel is supported by the upper housing and engaged while applying pressure to the conversion unit by elastic force of the joining portion, and
   the actuator and the conversion unit are supported by the lower housing and engaged while the conversion unit applies pressure to the actuator.

5. The tactile sensation providing device according to claim 1, wherein the actuator includes a laminated-type piezoelectric element.

6. A tactile sensation providing device, comprising:
   a panel;
   an actuator that displaces the panel in a thickness direction of the panel;
   a regulator that regulates displacement of the panel; and
   a conversion unit that engages with the panel and the actuator and that, in response to displacement of the actuator, converts a displacement direction of the actuator and a displacement amount of the actuator to a different displacement direction and a different displacement amount and displaces the panel according thereto,
   wherein the regulator is arranged in a corner of a top view of a housing of the tactile sensation providing device, and
   separate elements are used for the actuator and the conversion unit, and the conversion unit is pushed outward toward an edge of the panel by the actuator.

7. The tactile sensation providing device according to claim 6, wherein the actuator displaces the panel by displacing, on a panel rear surface, at least two points between which a center of gravity of the panel is located in a plan view of the tactile sensation providing device.

8. The tactile sensation providing device according to claim 6, wherein the actuator includes a laminated-type piezoelectric element.

* * * * *